(12) United States Patent
Strandjord et al.

(10) Patent No.: US 8,223,341 B2
(45) Date of Patent: Jul. 17, 2012

(54) SYSTEM AND METHOD FOR ENHANCING SIGNAL-TO-NOISE RATIO OF A RESONATOR FIBER OPTIC GYROSCOPE

(75) Inventors: Lee K. Strandjord, Tonka Bay, MN (US); Glen A. Sanders, Scottsdale, AZ (US); Tiequn Qiu, Glendale, AZ (US)

(73) Assignee: Honeywell International Inc., Morristown, NJ (US)

( * ) Notice: Subject to any disclaimer, the term of this patent is extended or adjusted under 35 U.S.C. 154(b) by 55 days.

(21) Appl. No.: 12/789,972

(22) Filed: May 28, 2010

(65) Prior Publication Data
US 2011/0292396 A1 Dec. 1, 2011

(51) Int. Cl.
*G01C 19/72* (2006.01)
(52) U.S. Cl. ..................................... 356/461
(58) Field of Classification Search .............. 356/459, 356/460, 461; 385/31, 32; 73/504.01
See application file for complete search history.

(56) References Cited

U.S. PATENT DOCUMENTS

| | | | |
|---|---|---|---|
| 3,861,220 A * | 1/1975 | Felsenthal, Jr. ............ 73/504.01 |
| 4,135,822 A | 1/1979 | Ezekiel | |
| 4,274,742 A | 6/1981 | Lustig | |
| 4,323,310 A | 4/1982 | Shaw | |
| 4,352,562 A | 10/1982 | Minden | |
| 4,673,293 A | 6/1987 | Sanders | |
| 4,702,600 A | 10/1987 | Handrich et al. | |
| 4,807,999 A | 2/1989 | Soo Hoo | |
| 4,863,272 A | 9/1989 | Coccoli | |
| 5,018,857 A | 5/1991 | Sanders | |
| 5,090,809 A | 2/1992 | Ferrar | |
| 5,131,749 A * | 7/1992 | Varnham ..................... 356/464 |
| RE34,121 E | 11/1992 | Benoist | |
| 5,229,831 A | 7/1993 | Carroll | |
| 5,237,387 A | 8/1993 | Sanders | |
| 5,289,258 A | 2/1994 | Szafraniec | |
| 5,296,912 A * | 3/1994 | Strandjord et al. ......... 356/461 |

(Continued)

FOREIGN PATENT DOCUMENTS

EP 0240949 10/1987

(Continued)

OTHER PUBLICATIONS

Strandjord, "RFOG With Optical Heterodyning for Optical Signal Discrimination", "U.S. Appl. No. 12/876,796, filed Sep. 7, 2010".

(Continued)

*Primary Examiner* — Tarifur Chowdhury
*Assistant Examiner* — Jonathan Hansen
(74) *Attorney, Agent, or Firm* — Fogg & Powers LLC (57) ABSTRACT

A resonator fiber optic gyroscope includes a sensing resonator having a first resonance frequency for a first laser beam propagation direction and a second resonance frequency for a second laser beam propagation direction; an intensity modulator coupled to an output of the sensing resonator and configured to modulate the intensity of a signal output from the sensing resonator, wherein the intensity modulator modulates the output signal at an intensity modulation frequency; and resonance tracking electronics coupled to an output of the intensity modulator and configured to demodulate the intensity modulated signal output from the intensity modulator at a resonance tracking modulation frequency to produce a first demodulated signal; the resonance tracking electronics further configured to demodulate the first demodulated signal at the intensity modulation frequency, wherein the intensity modulation frequency is different from the resonance tracking modulation frequency.

20 Claims, 4 Drawing Sheets

U.S. PATENT DOCUMENTS

| | | | |
|---|---|---|---|
| 5,325,174 A * | 6/1994 | Danko | 356/461 |
| 5,349,441 A | 9/1994 | Sanders | |
| 5,384,637 A | 1/1995 | Sanders et al. | |
| 5,459,575 A | 10/1995 | Malvern | |
| 5,465,149 A | 11/1995 | Strandjord et al. | |
| 5,469,257 A | 11/1995 | Blake et al. | |
| 5,493,623 A | 2/1996 | Frische et al. | |
| 5,526,451 A * | 6/1996 | Cahill et al. | 385/31 |
| 5,610,714 A | 3/1997 | Malvern | |
| 5,734,469 A | 3/1998 | Strandjord | |
| 5,767,968 A | 6/1998 | Strandjord | |
| 5,781,300 A | 7/1998 | Strandjord et al. | |
| 5,926,275 A * | 7/1999 | Sanders et al. | 356/464 |
| 6,014,217 A | 1/2000 | Sanders et al. | |
| 6,204,921 B1 | 3/2001 | Strandjord et al. | |
| 6,539,155 B1 | 3/2003 | Broeng | |
| 6,765,678 B2 | 7/2004 | Strandjord et al. | |
| 7,038,783 B2 * | 5/2006 | Standjord et al. | 356/460 |
| 7,123,800 B2 * | 10/2006 | Kaplan | 385/50 |
| 7,231,103 B2 * | 6/2007 | Yamashita | 385/11 |
| 7,245,381 B2 | 7/2007 | Marino | |
| 7,372,574 B2 | 5/2008 | Sanders et al. | |
| 7,388,671 B2 * | 6/2008 | Sanders et al. | 356/461 |
| 7,463,360 B2 * | 12/2008 | Hughes et al. | 356/461 |
| 7,522,284 B2 * | 4/2009 | Sanders et al. | 356/461 |
| 7,751,055 B2 | 7/2010 | Sanders et al. | |
| 7,802,928 B2 * | 9/2010 | Strabley et al. | 385/92 |
| 7,848,601 B2 * | 12/2010 | Carothers | 385/32 |
| 7,855,789 B2 * | 12/2010 | Strandjord et al. | 356/461 |
| 7,864,328 B2 * | 1/2011 | Strandjord | 356/461 |
| 7,869,052 B2 | 1/2011 | Strandjord | |
| 7,933,020 B1 | 4/2011 | Strandjord | |
| 8,009,296 B2 * | 8/2011 | Sanders et al. | 356/461 |
| 2002/0044737 A1 * | 4/2002 | Hung | 385/27 |
| 2003/0169428 A1 * | 9/2003 | Lange | 356/464 |
| 2004/0061863 A1 | 4/2004 | Digonnet | |
| 2004/0263856 A1 | 12/2004 | Willig et al. | |
| 2007/0097374 A1 * | 5/2007 | Ren-Young | 356/460 |
| 2007/0133003 A1 * | 6/2007 | Sanders et al. | 356/461 |
| 2008/0079946 A1 * | 4/2008 | Greening | 356/460 |
| 2010/0002239 A1 | 1/2010 | Strandjord et al. | |
| 2010/0225922 A1 | 9/2010 | Strandjord | |
| 2010/0225923 A1 * | 9/2010 | Strandjord et al. | 356/461 |
| 2010/0253948 A1 * | 10/2010 | Strandjord et al. | 356/464 |
| 2011/0181886 A1 * | 7/2011 | Strandjord et al. | 356/460 |
| 2011/0181887 A1 * | 7/2011 | Tarleton et al. | 356/464 |

FOREIGN PATENT DOCUMENTS

| | | |
|---|---|---|
| EP | 1391693 | 2/2004 |

OTHER PUBLICATIONS

Broeng et al., "Photonic Crystal Fibers: A New Class of Optical Waveguides", "Optical Fiber Technology", 1999, pp. 305-330, vol. 5, Publisher: Academic Press.

Carroll, "Backscatter and the Resonant Fiber-Optic Gyro Scale Factor", "Journal of Lightwave Technology", Dec. 1989, pp. 1895-1900, vol. 7, No. 12, Publisher: IEEE.

Carroll, "The Passive Resonator Fiber Optic Gyro and Comparison to the Interferometer Fiber Gyro", "Fiber Optic Gyros 10th Anniversary Conference", 1986, pp. 486-494, vol. 719, 169, 177, Publisher: SPIE.

Chen et al., "Highly birefringent hollow-core photonic bandgap fiber", "Optics Express 3888", Aug. 9, 2004, pp. 3888-3893, vol. 12, No. 16, Publisher: Optical Society of America.

R.F. Cregan et al., "Single-Mode Photonic Band Gap Guidance of Light in Air", Sep. 3, 1999, pp. 1537-1539, vol. 285, Published in: US.

Ezekiel, "Passive Ring Resonator Laser Gyroscope", "Applied Physics Letters", May 1, 1977, pp. 478-480, vol. 30, No. 9, Publisher: American Institute of Physics.

Hansen et al., "Air-Guiding Photoni Bandgap Fibers: Spectral Properties, Macrobending Loss, and Practical Handling", "Journal of Lightwave Technology", Jan. 2004, pp. 11-13, vol. 22, No. 1, Publisher: IEEE.

Hotate et al., "Resonator Fiber Optic Gyro Using Digital Serrodyne Modulation-Method to Reduce the Noise Induced by the Backscattering a", "13th International Conference on Optical Fiber Sensors", Apr. 12-16, 1999, pp. 104-107, vol. 3746, Publisher: SPIEE.

Hotate, "Drift Reduction in an Optical Passive Ring-Resonator Gyro", "Fiber Optic Gyros: 15th Anniversary Conference", 1991, pp. 116-127, vol. 1585, Publisher: SPIE.

Hotate, "Adjustment-Free Method to Eliminate the Noise Induced by the Backscattering in an Optical Passive Ring-Resonator Gyro", "IEEE Photonics Technology Letters", Jan. 1990, pp. 75-77, vol. 2, No. 1, Publisher: IEEE.

Iwatsuki, "Effect of Rayleigh Backscattering in an Optical Passive Ring-Resonator Gyro", "Applied Optics", Nov. 1, 1984, pp. 3916-3924, vol. 23, No. 21, Publisher: Optical Society of America.

Kaiser, "Experimental Developments in the RFOG", "Fiber Optic and Laser Sensors VIII", 1990, pp. 121-126, vol. 1367, Publisher: SPIE.

Mangan et al., "Low Loss (1.7dB/km) Hollow Core Photonic Bandgap Fiber", 2004, pp. 1-3, Publisher: Optical Society of America.

Sanders, Glen, "Critical Review of Resonator Fiber Optic Gyroscope Technology", "Proc. SPIE Fiber Optic and Laser Sensors X", Sep. 1992, pp. 133-159, vol. CF44, Publisher: SPIEE, Published in: Boston, MA.

Sanders et al., "Passive Ring Resonator Method for Sensitive Inertial Rotation Measurements in Geophysics and Relativity", "Optics Letter", Nov. 1981, pp. 569-571, vol. 6, No. 11, Publisher: Optical Society of America.

Sanders et al., "Novel Polarization-rotating Fiber Resonator for Rotation Sensing Applications", "Fiber Optic and Laser Sensors VII", 1989, pp. 373-381, vol. 1169, Publisher: Proc. SPIE.

Sanders et al., "Fiber Optic Gyro Technology Trends—A Honeywell Perspective", "Optical Fiber Sensors Conference Technical Digest", 2002, pp. 5-8, vol. 1, Publisher: IEEE.

Smith et al., "Recent Developments in Fiberoptic Ring Laser Gyros", "Fiber Optic and Laser Sensors VIII", 1990, pp. 103-106, vol. 1367, Publisher: SPIE.

Strandjord et al., "Performance Improvements of a Polarization-Rotating Resonator Fiber Optic Gyroscope", "Fiber Optic and Laser Sensors X", 1992, pp. 94-104, vol. 1795, Publisher: SPIE.

Suzuki et al., "Reduction of Backscattering Induced Noise by Ternary Phase Shift Keying in Monolithically Integrated Micro Optic Gyro on", "13th International Conference on Optical Fiber Sensors", Apr. 12-16, 1999, pp. 78-81, vol. 3746, Publisher: SPIE.

Rakhmanov, "Demodulation of Intensity and Shot Noise in the Optical Heterodyne Detection of Laser Interferometers for Gravitional Waves", "Applied Optics", Dec. 20, 2001, pp. 6596-6605, vol. 40, No. 36.

* cited by examiner

SYSTEM AND METHOD FOR ENHANCING SIGNAL-TO-NOISE RATIO OF A RESONATOR FIBER OPTIC GYROSCOPE

BACKGROUND

Resonator fiber optic gyroscopes (RFOGs) are a form of passive cavity optical gyros that use the Sagnac effect. RFOGs combine the resonator finesse function of a Ring Laser Gyroscope (RLG) and the multi-fiber-turn capability of the Interferometric Fiber Optic Gyroscope (IFOG). RFOGs use clockwise (CW) and counterclockwise (CCW) light waves from lasers to measure the difference between CW and CCW resonance frequencies of a resonator comprising a multi-turn fiber coil to determine rotation rate.

SUMMARY

In one embodiment a resonator fiber optic gyroscope is provided. The resonator fiber optic gyroscope includes a sensing resonator having a first resonance frequency for a first laser beam propagation direction and a second resonance frequency for a second laser beam propagation direction; an intensity modulator coupled to an output of the sensing resonator and configured to modulate the intensity of a signal output from the sensing resonator, wherein the intensity modulator modulates the output signal at an intensity modulation frequency; and resonance tracking electronics coupled to an output of the intensity modulator and configured to demodulate the intensity modulated signal output from the intensity modulator at a resonance tracking modulation frequency to produce a first demodulated signal; the resonance tracking electronics further configured to demodulate the first demodulated signal at the intensity modulation frequency, wherein the intensity modulation frequency is different from the resonance tracking modulation frequency.

DRAWINGS

Understanding that the drawings depict only exemplary embodiments and are not therefore to be considered limiting in scope, the exemplary embodiments will be described with additional specificity and detail through the use of the accompanying drawings, in which.

In accordance with common practice, the various described features are not drawn to scale but are drawn to emphasize specific features relevant to the exemplary embodiments.

DETAILED DESCRIPTION

In the following detailed description, reference is made to the accompanying drawings that form a part hereof, and in which is shown by way of illustration specific illustrative embodiments. However, it is to be understood that other embodiments may be utilized and that logical, mechanical, and electrical changes may be made. Furthermore, the methods presented in the drawing figures and the specification are not to be construed as limiting the order in which the individual acts may be performed. The following detailed description is, therefore, not to be taken in a limiting sense.

Figure 1:
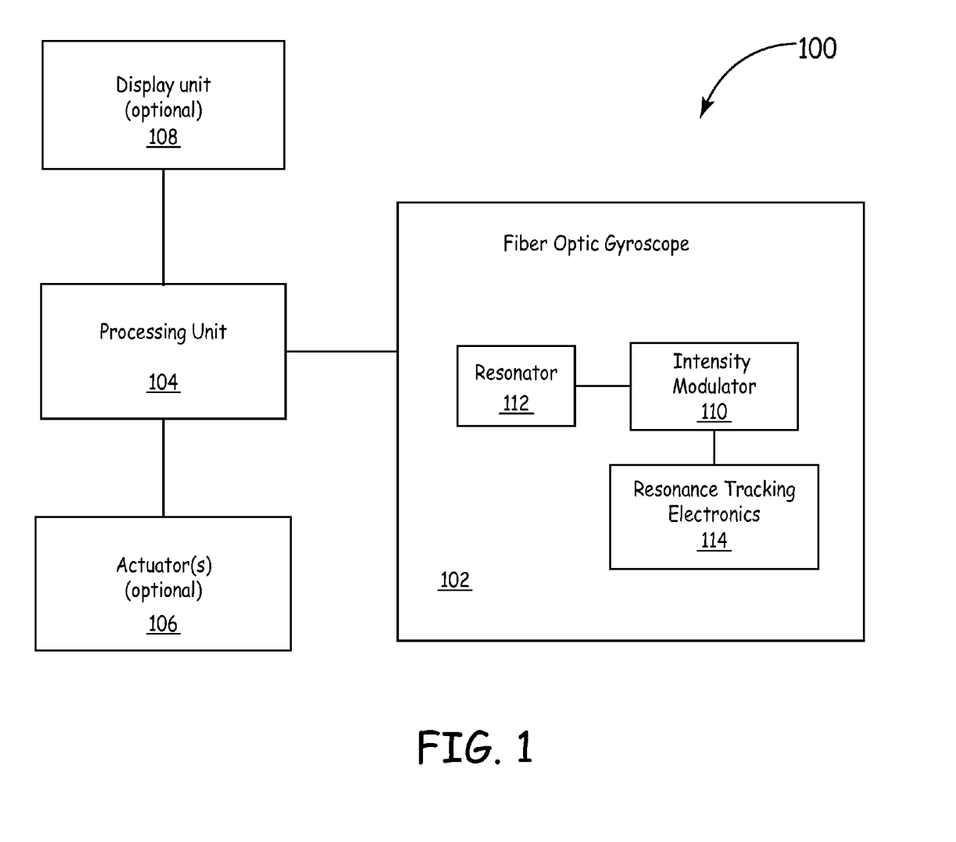
FIG. 1 is a block diagram of one embodiment of a system.

FIG. 1 is a block diagram of one embodiment of a system 100. The system 100 is a navigation system in this embodiment. However, it is to be understood that, in other embodiments, the RFOG 102 can be used in other systems, such as, but not limited to, a platform stabilization system or a pointing system. The navigation system 100 includes a resonator fiber optic gyroscope (RFOG) 102. For example, in some embodiments, the RFOG 102 is implemented as part of an inertial sensor unit that includes one or more RFOGs and one or more linear accelerometers. The RFOG 102 measures rotation rate and outputs a signal indicative of rotation rate to a processing unit 104. The processing unit 104 uses the measured rotation rate from the RFOG 102 to calculate parameters such as position, orientation, and angular velocity.

The processing unit 104 uses the calculated parameters, in some embodiments, to calculate control signals that are output to one or more optional actuators 106. For example, in some embodiments, the navigation system 100 is implemented in an unmanned vehicle. Hence, the actuators 106 are implemented according to the vehicle type. For example, in an unmanned aerial vehicle, the actuators 106 are implemented as wing flaps, thruster, etc.

Additionally, in some embodiments, the processing unit 104 outputs the calculated parameters to an optional display unit 108. For example, in some embodiments, the display unit 108 displays the geographic location, velocity, and/or orientation (e.g. pitch, roll, and/or yaw) of a vehicle in which the RFOG 102 is located. The display unit 108 can be implemented as any suitable display unit such as, but not limited to, various CRT, active and passive matrix LCD, and plasma display units.

The RFOG 102 is configured to enhance the signal-to-noise ratio for measuring rotation rate. In particular, the RFOG 102 includes an intensity modulator 110 coupled between an output of a resonator 112 and an input of resonance tracking electronics 114. The intensity modulator 110 places a signature on the resonator output light waves that allow the resonance tracking electronics 114 to discriminate between resonator output signals and noise, such as electronic pickup or other types of electronic sources of error. In particular, the intensity modulator 110 modulates the intensity or amplitude of light output from the resonator in a predetermined manner that can be distinguished by the resonance tracking electronics 114 from signal modulations caused by electronic noise sources.

Figure 2:
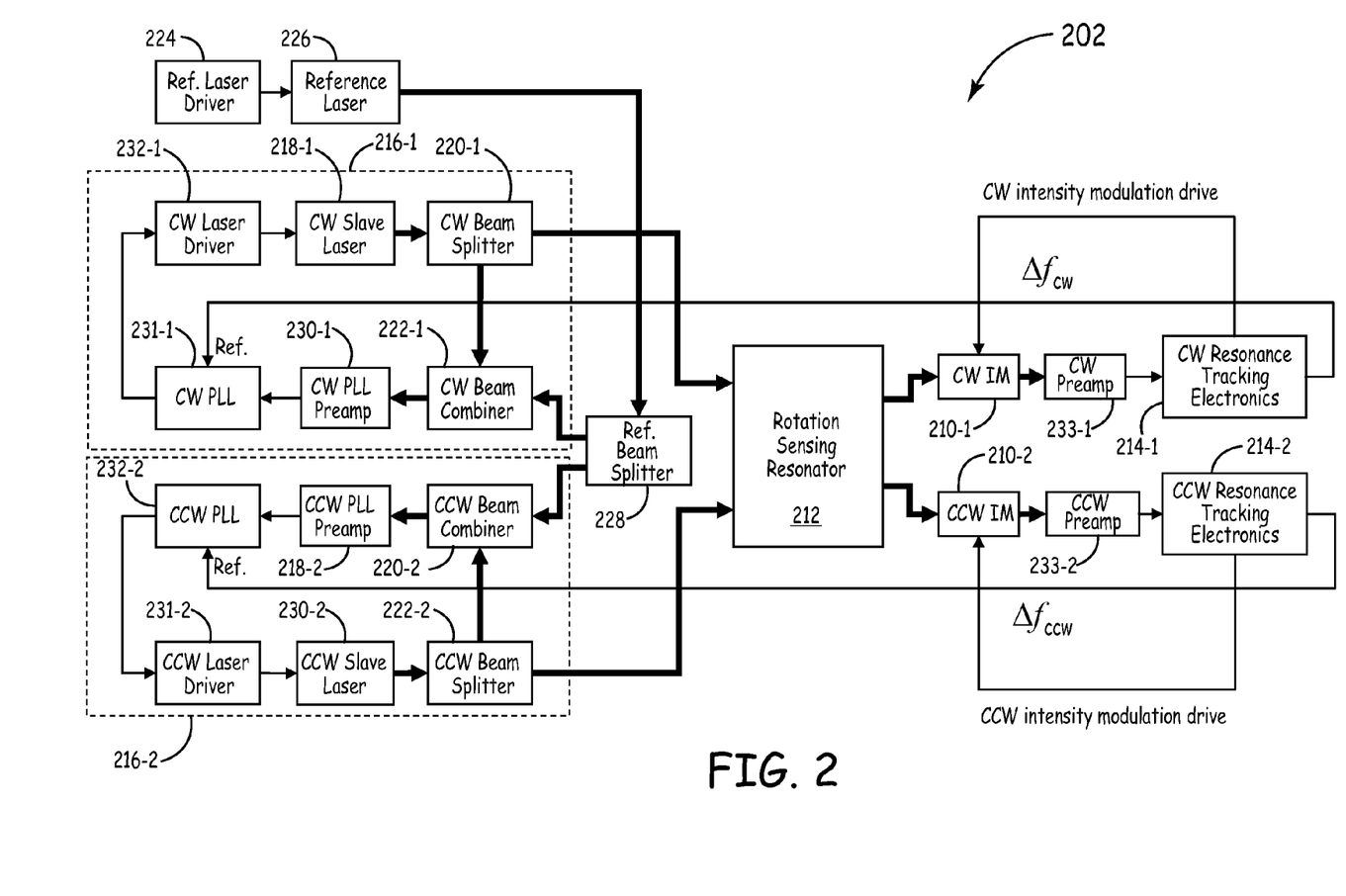
FIG. 2 is a block diagram of one embodiment of a resonator fiber optic gyroscope.

FIG. 2 is a block diagram of one exemplary embodiment of a resonance fiber optic gyroscope 202 that includes an intensity modulator 210 between an output of a rotation sensing resonator 212 and resonance tracking electronics 214. In particular, as shown in FIG. 2, RFOG 202 includes a clockwise (CW) intensity modulator 210-1 coupled between a first output of the resonator 212 and CW resonance tracking electronics 214-1, and a counter-clockwise (CCW) intensity modulator 210-2 coupled between a second output of the resonator 212 and CCW resonance tracking electronics 214-2.

The RFOG 202 also includes a first laser source 216-1 and a second laser source 216-2. The first laser source 216-1 is coupled to the resonator 212 and provides a frequency modulated laser beam that propagates in a clockwise direction through the resonator 212, also referred to as a CW laser beam. As used herein, the terms "laser beam", "light wave", and "light" are used interchangeably. Similarly, the second laser source 216-2 is coupled to the resonator 212 and provides a frequency modulated laser beam that propagates in a counter clockwise direction through the resonator 212, also referred to a CCW laser beam.

In this embodiment, the first laser source 216-1 comprises a CW slave laser 218-1 and CW beam splitter 220-1. The CW beam splitter 220-1 splits light from the CW laser 218-1 into two beams. One laser beam goes to the rotation sensing resonator 212 and the other goes to a CW beam combiner 222-1. The CW beam combiner 222-1 combines the CW beam with a component of a reference laser beam. In particular, the exemplary RFOG 202 includes a reference laser driver 224 which drives a reference laser 226. The reference laser 226 produces a reference laser beam which is split into two beams by a reference beam splitter 228. One output of the reference beam splitter 228 goes to the CW beam combiner 222 and the other output of the reference beam splitter 228 goes to a CCW beam combiner 222-2.

The CW beam combiner 222-1 optically mixes the CW laser beam with the reference laser beam from the reference beam splitter 228. The optical mixing creates an intensity signal at the output of the CW beam combiner 222-1. The frequency of the intensity signal is the beat frequency between the CW and reference laser beams. The intensity signal is converted to an electrical signal by a CW phase-lock-loop (PLL) preamplifier (preamp) 230-1. The CW PLL 231-1 locks the CW slave laser 218-1 to the reference laser 226 with a frequency offset determined by a reference frequency $\Delta f_{cw}$, which is electronically generated by the CW resonance tracking electronics 214-1. The CW PLL 231-1 controls the CW laser frequency via the CW laser driver 232-1 to maintain the beat signal between the CW and reference lasers at the reference frequency $\Delta f_{cw}$.

The CW beam that goes to the rotation sensing resonator 212 is locked onto a resonance frequency of the resonator 212. To determine the center of the resonator CW resonance frequency the frequency of the CW beam is frequency modulated. Because of the modulation, the CW output of the sensing resonator 212 is a signal that is indicative of the frequency difference between the CW laser beam frequency and the center frequency of the CW resonance frequency. The signal at the modulation frequency will pass through zero amplitude when the CW laser beam frequency is at the resonance frequency. The CW resonance tracking electronics 214-1 demodulates the resonator CW output signal at the modulation frequency and generates a control signal, $\Delta f_{cw}$, that indicates when the CW laser is off resonance. The control signal is used by a servo in the CW resonance tracking electronics 214-1 to control the CW laser 218-1 to the resonance frequency. The CW resonance tracking electronics 214-1 outputs the control signal $\Delta f_{cw}$ to the CW PLL 231-1 to be used as a reference frequency. The CW resonance tracking electronics 214-1 maintains the CW laser frequency at the CW resonance frequency by controlling the reference frequency $\Delta f_{cw}$.

The second laser source 216-2 is configured similar to the first laser source 216-1 and provides a laser beam that propagates in a counter clockwise direction through the resonator 212, also referred to as the CCW laser beam. The CCW laser beam is controlled in a manner similar to the CW laser beam discussed above, but to have a beat frequency $\Delta f_{ccw}$ with the reference laser frequency. Rotation rate is derived from taking the difference between the magnitudes of the two beat frequencies $\Delta f_{cw}$ and $\Delta f_{ccw}$.

The RFOG 202 is configured to reduce or eliminate rotation sensing errors due to electronic pickup. In particular, in this example, the RFOG 202 includes CW and CCW preamps 233-1 and 233-2 which converts the respective optical resonator output signals to electrical signals. By placing intensity modulators (IMs) 210-1 and 210-2 before the CW and CCW preamps 233-1 and 233-2, respectively, the CW and CCW resonator output light intensity can be modulated to place a signature on the resonator output light waves that allows the resonance tracking electronics 214-1 and 214-2 to discriminate between resonator output signals and electronic pickup.

For example, the CW resonance tracking electronics 214-1 generates a CW intensity modulation signal that drives the CW intensity modulator 210-1 at a frequency that is different and not harmonically related with the CW resonance tracking modulation frequency. Thus, a resonator output signal at an input of the CW preamp 233-1 is at the sum and difference frequency between the resonance tracking modulation frequency and the intensity modulator (IM) modulation frequency. The CW preamp 233-1 converts the intensity modulated optical signal to an electrical signal. For example, the CW preamp 233-1 can include a photo-detector for converting optical signals to electrical signals. It is to be understood that the CCW resonance tracking electronics 214-2 and the CCW intensity modulator 210-2 operate in a similar fashion. Furthermore, in some embodiments, the intensity modulation frequency of the intensity modulator 210-1 is different from the intensity modulation frequency of the intensity modulator 210-2. In other embodiments, the same intensity modulation frequency can be used.

Electronic pickup typically occurs at either the resonance tracking modulation frequency or at the intensity modulation frequency, but has negligible components at the sum and difference frequencies. To have a component at the sum and difference frequencies between the resonance tracking and intensity modulation frequencies, the electronic pickup components at the resonance tracking frequency and at the intensity modulation frequency would have to "mix" or multiple by some non-linearity in the electronics. Since both the electronic pickup and electronic non-linearity is typically small, electronic pickup at the sum and difference frequencies is negligible.

The CW resonance tracking electronics 214-1 and CCW resonance tracking electronics 214-2 are configured to detect the resonance output signals at the sum and difference frequencies. For example, a double demodulation technique can be employed in the CW and CCW resonance tracking electronics 214-1 and 214-2 to discriminate between resonator output signals and unwanted electronic pickup.

Figure 3:
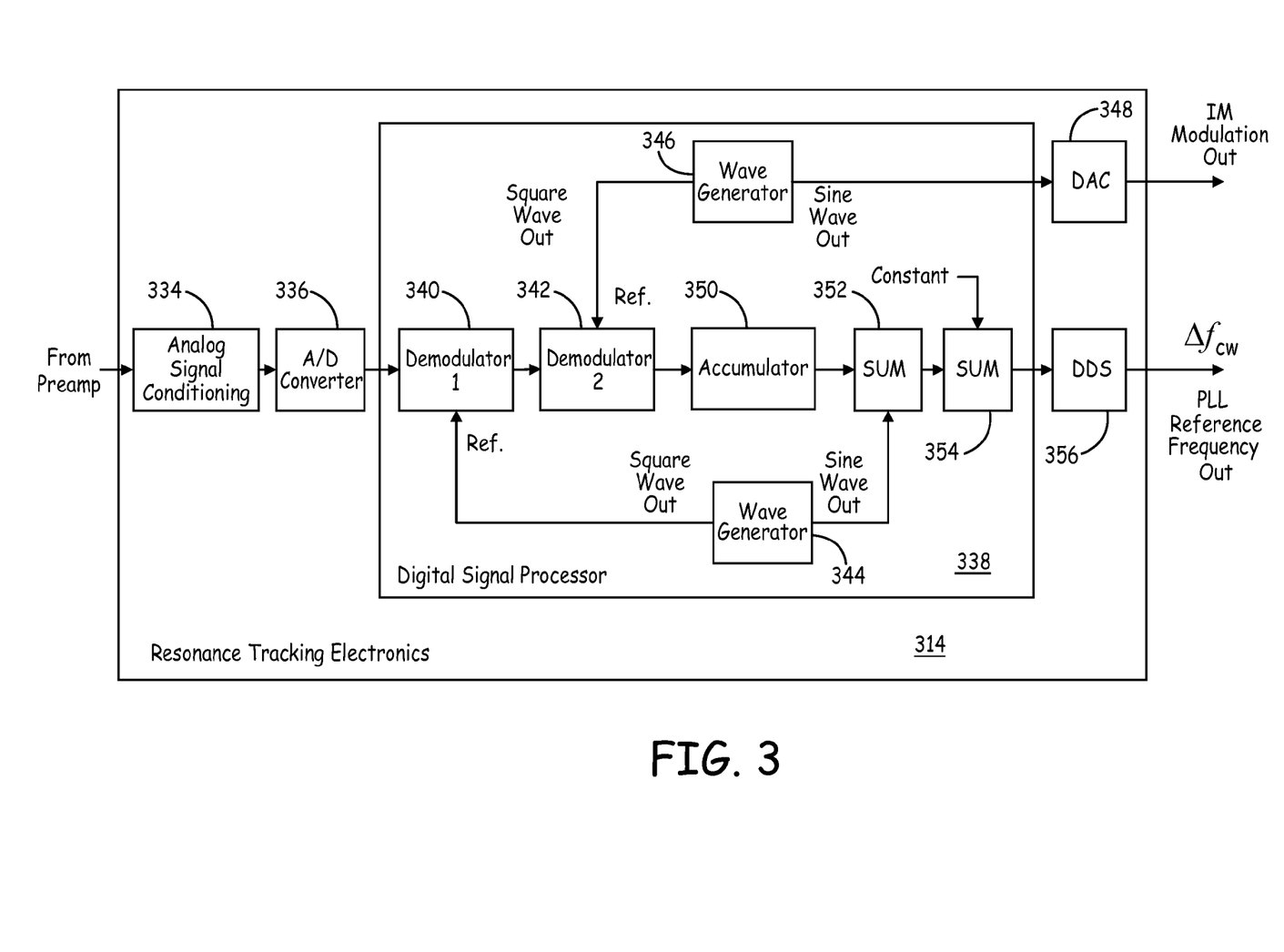
FIG. 3 is a block diagram of one embodiment of resonance tracking electronics.

FIG. 3 is a block diagram of exemplary resonance tracking electronics 314 employing a double demodulation technique. The resonance tracking electronics 314 includes signal conditioning circuit 334 which conditions the electrical signal from a respective preamp, such as preamp 233-1 or 233-2 shown in FIG. 2. For example, the signal conditioning circuit 334 may include filtering of unwanted signals to allow further analog gain with saturating electronics and anti-aliasing filtering before being digitized by the A/D converter 336. After being digitized, the digital signal goes to a digital signal processor 338. The digital signal processor 338 can be implemented, for example, as a field programmable array (FPGA) chip, an application specific integrated circuit (ASIC) or a microprocessor.

The digital signal processor 338 includes a first digital signal wave generator 344 that outputs a square wave at the resonance tracking modulation frequency to a first demodulator 340. The square wave is used as a reference frequency for the first demodulator 340. Thus, the first demodulator 340 demodulates the signal from the signal conditioning circuit 334 at the resonance tracking modulation frequency.

The digital signal processor 338 also includes a second digital signal wave generator 346. The second digital signal wave generator generates a sine wave that is converted by a digital to analog converter (DAC) 348 that drives a respective intensity modulator, such as CW intensity modulator 210-1 and CCW intensity modulator 210-2 shown in FIG. 2. The second digital signal wave generator 346 also produces a square wave at the intensity modulation frequency that is used as a reference frequency for the second demodulator 342. Thus, the second demodulator 342 demodulates the signal received from the first demodulator 340 at the intensity modulation frequency. Since the intensity modulation frequency is not harmonically related to the resonance tracking modulation frequency, the only signals that will pass through both demodulators 340 and 342 are those signals that are occurring at the sum and difference frequencies between the resonance tracking and intensity modulation frequencies.

The output of the second demodulator 342 is approximately integrated in an accumulator 350. The output of the accumulator 350 is coupled to a first summer 352. The first summer 352 sums the output of the accumulator 350 with a digital sine wave at the resonance tracking modulation frequency provided by the first digital signal wave generator 344. The output of the first summer 352 is then summed with a constant value in a second summer 354. The constant value represents the nominal beat frequency between the reference laser and the corresponding slave laser. When the demodulator output is zero, the output of the accumulator 350 summed with the constant value is a digital value that represents the average of the reference frequency that puts the corresponding slave laser onto the respective resonance frequency of the sensing resonator. The output of the second summer 354 is used to produce the reference frequency in a direct digital synthesizer 356.

Figure 4:
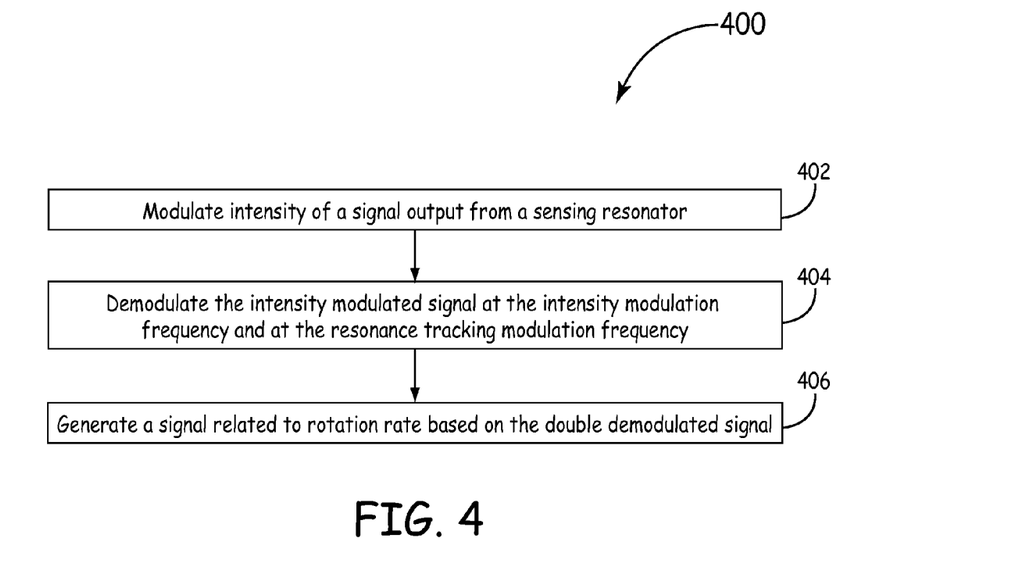
FIG. 4 is a flow chart of one embodiment of a method of enhancing signal-to-noise ratio for measuring rotation rate in a resonator fiber optic gyroscope.

FIG. 4 is flow chart of one embodiment of a method 400 of enhancing signal-to-noise ratio for measuring rotation rate in a resonator fiber optic gyroscope. At block 402, the intensity of an optical signal output from a sensing resonator, such as resonator 212, is modulated at an intensity modulation frequency. The intensity modulation frequency different from and not harmonically related to a resonance tracking modulation frequency. Thus, the intensity or amplitude of the light is modulated at a frequency that is different than the modulation frequency that is used to detect the signal. For example, if the signal to be detected is at 10 KHz, the intensity modulation frequency may be at 3 KHz. The intensity modulation, therefore, frequency shifts the light signal to be a 10 khz signal with an amplitude modulation of 3 khz.

At block 404, the intensity modulated electrical signal is demodulated at the intensity modulation frequency and at the resonance tracking modulation frequency. In some embodiments, the intensity modulated electrical signal is first demodulated at the resonance tracking modulation frequency to produce a first demodulated signal. The first demodulated signal is then demodulated at the intensity modulation frequency. For example, using the exemplary values from above, demodulating the intensity modulated signal at the resonance tracking modulation frequency of 10 KHz results in a signal with a 3 KHz modulation frequency rather than a direct current (DC) signal. Demodulating the 3 KHz signal at the intensity modulation frequency of 3 KHz then results in DC signal which can be used for detecting rotation.

Since the intensity modulation frequency is different from and not harmonically related to the resonance tracking modulation frequency, in this embodiment, electronic noise that is coherent with either the resonance tracking modulation or the intensity modulation is blocked out by the double demodulation. For example, noise, such as electronic pickup noise, will typically be either at 10 KHz or at 3 KHZ, but not at both since the frequencies are not harmonically related, in this example. If the noise is at 10 KHz, the first demodulation will demodulate the noise down to DC not down to 3 khz The second demodulation then blocks out any DC so it blocks out the noise. If the noise is at 3 KHZ, the first demodulation would put the noise at 7 KHz since the first demodulation is at 10 KHz. The 7 KHZ noise signal is then blocked by the second demodulation at 3 KHz because the two frequencies are not harmonically related.

Although, the above description demodulates at the resonance tracking modulation frequency, in other embodiments, the demodulation order is reversed. In particular, the intensity modulated electrical signal is first demodulated at the intensity modulation frequency to produce the first demodulated signal. The first demodulated signal is then demodulated at the resonance tracking modulation frequency.

At block 406, the double demodulated signal is used to generate a signal related to rotation rate. For example, as described above, in some embodiments, the double demodulated signal is integrated and then summed with a sine wave at the resonance tracking modulation frequency. The summed signal is then again summed with a constant value representative of a nominal beat frequency between a respective laser source and a reference laser.

Although specific embodiments have been illustrated and described herein, it will be appreciated by those of ordinary skill in the art that any arrangement, which is calculated to achieve the same purpose, may be substituted for the specific embodiments shown. For example, although the intensity modulation frequency and the resonance tracking modulation frequency are described herein as not harmonically related, in other embodiments, the frequencies can be harmonically related. Therefore, it is manifestly intended that this invention be limited only by the claims and the equivalents thereof.

What is claimed is:

1. A fiber optic gyroscope comprising:
a first laser source configured to produce a first laser beam having a first frequency;
a second laser source configured to produce a second laser beam having a second frequency;
a sensing resonator having a first input coupled to the first laser source and a second input coupled to the second laser source such that the first laser beam propagates through the sensing resonator in a first direction and the second laser beam propagates through the sensing resonator in a second direction;
first resonance tracking electronics (RTE) configured to generate a first control signal that indicates when the first laser beam is off resonance;
second resonance tracking electronics (RTE) configured to generate a second control signal that indicates when the second laser beam is off resonance;
a first intensity modulator coupled between a first output of the sensing resonator and an input of the first resonance tracking electronics, the first intensity modulator configured to modulate the intensity of a signal from the first output of the sensing resonator at a first intensity modulation frequency such that the first resonance tracking electronics is able to discriminate between the signal from the first output of the sensing resonator and electronic noise, wherein the first intensity modulation frequency is different from a resonance tracking modulation frequency of the first RTE; and
a second intensity modulator coupled between a second output of the sensing resonator and an input of the second resonance tracking electronics, the second intensity modulator configured to modulate the intensity of a signal from the second output of the sensing resonator at a second intensity modulation frequency such that the second resonance tracking electronics is able to discriminate between the signal from the second output of the sensing resonator and electronic noise, wherein the second intensity modulation frequency is different from a resonance tracking modulation frequency of the second RTE.

2. The fiber optic gyroscope of claim 1, wherein the fiber optic gyroscope further comprises:
a reference laser configured to produce a reference laser beam;
a first phase-lock-loop (PLL) to beat the first laser beam with the reference laser beam and to drive the first laser source such that the first laser beam is locked to the reference laser beam; and
a second phase-lock-loop (PLL) to beat the second laser beam with the reference laser beam and to drive the second laser source such that the second laser beam is locked to the reference laser beam.

3. The fiber optic gyroscope of claim 2, wherein:
the first RTE is further configured to output a first reference frequency to the first PLL to maintain the first frequency at a first resonance frequency of the sensing resonator; and
the second RTE is further configured to output a second reference frequency to the second PLL to maintain the second frequency at a second resonance frequency of the sensing resonator.

4. The fiber optic gyroscope of claim 1, further comprising:
a first preamplifier coupled between an output of the first intensity modulator and the input of the first RTE, the first preamplifier configured to convert the intensity modulated signal from the first intensity modulator to an electrical signal;
a second preamplifier coupled between an output of the second intensity modulator and the input of the second RTE, the second preamplifier configured to convert the intensity modulated signal from the second intensity modulator to an electrical signal.

5. The fiber optic gyroscope of claim 1, wherein each of the first and second RTE comprises:
a first demodulator configured to demodulate the intensity modulated signal from the respective intensity modulator at the respective resonance tracking modulation frequency; and
a second demodulator coupled to an output of the first demodulator and configured to demodulate a signal output from the first demodulator at the intensity modulation frequency of the respective intensity modulator.

6. The fiber optic gyroscope of claim 5, wherein each of the first and second demodulators is a lock-in amplifier.

7. The fiber optic gyroscope of claim 5, wherein each of the first and second RTE further comprises:
an analog-to-digital converter configured to convert the intensity modulated signal to a digital signal; and
a digital signal processor coupled to the analog-to-digital converter, wherein the digital signal processor includes the first demodulator and the second demodulator.

8. The fiber optic gyroscope of claim 7, wherein the digital signal processor of each of the first and second RTE further comprises:
a first digital signal wave generator configured to output a square wave at the respective resonance tracking modulation frequency to the first demodulator;
a second digital signal wave generator configured to output a sine wave at the respective intensity modulation frequency to the respective intensity modulator to drive the respective intensity modulator, wherein the second digital signal wave generator is further configured to output a square wave at the respective intensity modulation frequency to the second demodulator;
an accumulator configured to integrate an output of the second demodulator;
a first summer configured to sum the integrated output of the accumulator with a sine wave at the respective resonance tracking modulation frequency generated by the first digital signal wave generator; and
a second summer configured to sum an output of the first summer with a constant value.

9. The fiber optic gyroscope of claim 1 wherein the first intensity modulation frequency is not harmonically related to the resonance tracking modulation frequency of the first RTE; and
wherein the second intensity modulation frequency is not harmonically related with the resonance tracking modulation frequency of the second RTE.

10. A system comprising:
a resonator fiber optic gyroscope configured to measure rotation rate; and
a processing unit coupled to the resonator fiber optic gyroscope and configured to perform calculations based on the rotation rate measured by the resonator fiber optic gyroscope;
wherein the resonator fiber optic gyroscope includes:
a sensing resonator having a first resonance frequency for a first laser beam propagation direction and a second resonance frequency for a second laser beam propagation direction;
an intensity modulator coupled to an output of the sensing resonator and configured to modulate the intensity of a signal output from the sensing resonator, wherein the intensity modulator modulates the output signal at an intensity modulation frequency; and
resonance tracking electronics coupled to an output of the intensity modulator and configured to demodulate the intensity modulated signal output from the intensity modulator at a resonance tracking modulation frequency to produce a first demodulated signal; the resonance tracking electronics further configured to demodulate the first demodulated signal at the intensity modulation frequency, wherein the intensity modulation frequency is different from the resonance tracking modulation frequency.

11. The system of claim 10, wherein the resonator fiber optic gyroscope further comprises:
a first laser source coupled to a first input of the sensing resonator and configured to produce a first laser beam having a first frequency;
a second laser source coupled to a second input of the sensing resonator and configured to produce a second laser beam having a second frequency;
a reference laser configured to produce a reference laser beam;
a first phase-lock-loop (PLL) to beat the first laser beam with the reference laser beam and to drive the first laser source such that the first laser beam is locked to the reference laser beam; and
a second phase-lock-loop (PLL) to beat the second laser beam with the reference laser beam and to drive the second laser source such that the second laser beam is locked to the reference laser beam.

12. The system of claim 10, wherein the resonator fiber optic gyroscope further comprises a preamplifier coupled between an output of the intensity modulator and an input of the resonance tracking electronics, the preamplifier configured to convert the output from the intensity modulator to an electrical signal.

13. The system of claim 10, wherein the resonator fiber optic gyroscope further comprises:
an analog-to-digital converter configured to convert an output of the intensity modulated signal to a digital signal; and
a digital signal processor coupled to the analog-to-digital converter, wherein the digital signal processor includes:
a first demodulator configured to produce the first demodulated signal;
a second demodulator coupled to an output of the first demodulator and configured to demodulate the first demodulated signal at the intensity modulation frequency;
a first digital signal wave generator configured to output a square wave at the resonance tracking modulation frequency to the first demodulator; and
a second digital signal wave generator configured to output a square wave at the intensity modulation frequency to the second demodulator.

14. The system of claim 13, wherein the second digital signal wave generator is further configured to output a sine wave at the intensity modulation frequency to the intensity modulator to drive the intensity modulator.

15. The system of claim 13, wherein the digital signal processor further comprises:
an accumulator configured to integrate an output of the second demodulator;
a first summer configured to sum the integrated output of the accumulator with a sine wave at the resonance tracking modulation frequency generated by the first digital signal wave generator; and
a second summer configured to sum an output of the first summer with a constant value.

16. The system of claim 10, wherein the intensity modulation frequency is not harmonically related with the resonance tracking modulation frequency.

17. A method of enhancing signal-to-noise ratio for measuring rotation rate in a resonator fiber optic gyroscope, the method comprising:
modulating intensity of a signal output from a sensing resonator, wherein the intensity is modulated at an intensity modulation frequency that is different from a resonance tracking modulation frequency;
demodulating the intensity modulated signal at the intensity modulation frequency and at the resonance tracking modulation frequency to produce a double demodulated signal; and
generating a signal related to rotation rate based on the double demodulated signal.

18. The method of claim 17, wherein demodulating the intensity modulated signal comprises one of:
demodulating the intensity modulated signal at the resonance tracking modulation frequency to produce a first demodulated signal and demodulating the first demodulated signal at the intensity modulation frequency to produce the double demodulated signal; or
demodulating the intensity modulated signal at the intensity modulation frequency to produce a first demodulated signal and demodulating the first demodulated signal at the resonance tracking modulation frequency to produce the double demodulated signal.

19. The method of claim 17, wherein modulating intensity of the signal output from the sensing resonator comprises:
modulating intensity of the signal output from the sensing resonator at an intensity modulation frequency that is not harmonically related to a resonance tracking modulation frequency.

20. The method of claim 17, wherein generating a signal related to rotation rate comprises:
integrating the double demodulated signal;
summing the integrated signal with a sine wave at the resonance tracking modulation frequency to produce a first summed signal; and
summing the first summed signal with a constant value representing a nominal beat frequency to produce the signal related to rotation rate.

* * * * *